United States Patent
Beri

(10) Patent No.: US 11,645,107 B2
(45) Date of Patent: May 9, 2023

(54) PROCESSING MULTI-FRAME TASKS IN A MULTI-THREADED DIGITAL DESIGN SYSTEM

(71) Applicant: Adobe Inc., San Jose, CA (US)

(72) Inventor: Tarun Beri, Punjab (IN)

(73) Assignee: Adobe Inc., San Jose, CA (US)

( * ) Notice: Subject to any disclaimer, the term of this patent is extended or adjusted under 35 U.S.C. 154(b) by 131 days.

(21) Appl. No.: 17/148,295

(22) Filed: Jan. 13, 2021

(65) Prior Publication Data

US 2022/0222107 A1 Jul. 14, 2022

(51) Int. Cl.
*G06F 3/00* (2006.01)
*G06F 9/48* (2006.01)
*G06F 9/54* (2006.01)

(52) U.S. Cl.
CPC .............. *G06F 9/4843* (2013.01); *G06F 9/54* (2013.01)

(58) Field of Classification Search
CPC ................................ G06F 9/54; G06F 9/4843
USPC ......................................................... 719/310
See application file for complete search history.

(56) References Cited

U.S. PATENT DOCUMENTS

| 6,733,449 | B1 * | 5/2004 | Krishnamurthy ... G01S 7/52025 600/437 |
| 2003/0081543 | A1 * | 5/2003 | Goetzinger ........... H04L 47/521 370/229 |
| 2004/0202123 | A1 * | 10/2004 | Yoon ....................... H04L 65/80 370/329 |
| 2013/0063445 | A1 * | 3/2013 | Blanco ..................... G06T 11/00 345/473 |
| 2013/0063459 | A1 * | 3/2013 | Schneider ............... G06F 9/451 345/581 |
| 2015/0269739 | A1 * | 9/2015 | Ho .......................... G06T 7/285 382/164 |
| 2017/0295254 | A1 * | 10/2017 | Moothoor ............. H04L 67/566 |
| 2019/0220655 | A1 * | 7/2019 | Prashant ................ G06V 20/41 |

(Continued)

FOREIGN PATENT DOCUMENTS

| CA | 2601034 A1 * | 9/2006 | |
| JP | 3577348 B2 * | 10/2004 | ......... H04L 12/2854 |
| WO | WO-2014168807 A1 * | 10/2014 | ........... G06F 3/0481 |

OTHER PUBLICATIONS

Hui Liang Khor, Parallel Digital Watermarking Process on Ultrasound Medical Images in Multicores Environment (Year: 2016).*

(Continued)

*Primary Examiner* — Lechi Truong
(74) *Attorney, Agent, or Firm* — Nicholson De Vos Webster & Elliott LLP

(57) ABSTRACT

Embodiments are disclosed for processing multi-frame tasks in a multi-threaded digital design system. In particular, in one or more embodiments, the disclosed systems and methods comprise receiving, by a first thread, a first set of inputs on a graphical user interface, determining that the first set of inputs represent a first multi-frame request, wherein a multi-frame request includes a series of inputs that produce a continuous response, generating a first multi-frame edit task, the first multi-frame edit task including a communications channel between the first thread and a second thread for caching the first set of inputs, enqueuing the first multi-frame edit task in a task queue of the second thread, processing, by the second thread, the first multi-frame edit task.

17 Claims, 9 Drawing Sheets

(56) References Cited

U.S. PATENT DOCUMENTS

2019/0243896 A1* 8/2019 Tokuchi ............... G06F 40/30
2019/0325550 A1* 10/2019 Hu ..................... G06F 11/3062
2020/0210329 A1* 7/2020 Xu ........................ G06T 1/60

OTHER PUBLICATIONS

Junchang Wang, EQueue: Elastic Lock-Free FIFO Queue for Core-to-Core Communication on Multi-Core Processors (Year: 2020).*

* cited by examiner

PROCESSING MULTI-FRAME TASKS IN A MULTI-THREADED DIGITAL DESIGN SYSTEM

BACKGROUND

Computing devices (e.g., computers, tablets, smart phones) provide numerous ways for users to capture, create, share, view, and otherwise interact with numerous types of digital content (e.g., digital images). For example, touch screens are frequently included as part of a variety of computing devices such as: laptops, tablets, personal digital assistants, media players, mobile phones, and even large format interactive displays. Computing devices with touch screens allow users to interact with digital content, for example, using a graphical user interface present on the touch screen. Additionally, many computing devices facilitate interaction with digital content via one or more applications.

Some existing solutions utilize multiple threads to process user inputs, including a primary thread that provides a user interface and the receiving of user inputs, and a background thread that performs the bulk of the processing of the received user inputs, allowing the primary thread to remain relatively lightly loaded. These solutions often perform adequately for discrete operations where asynchronous responses are acceptable. However, they are often insufficient for handling multi-frame edits or operations, where the user inputs comes in a series of steps and a continuous response is expected, resulting in lags in application responsiveness, lost user inputs, the interleaving of user input information from multiple user inputs, and/or other negative impacts to performance.

These and other problems exist with regards to processing user inputs on touch screen devices.

SUMMARY

Introduced here are techniques/technologies for handling multi-frame requests that allows a digital design system to synchronously process user inputs for a multi-frame request between asynchronous primary and background processing threads. The digital design system can receive user input information, and, when the user input information is indicative of a multi-frame request, create a communications channel between the primary thread and the background thread for caching the user inputs of the multi-frame request for processing when the background thread is available. By caching the received user inputs for a multi-frame operation for subsequent processing between the primary thread and the background thread, embodiments of the present disclosure provide benefits and/or solve one or more of the foregoing or other problems in the existing systems.

In particular, in one or more embodiments, a primary thread of a digital design system can receive a first set of inputs on a graphical user interface and determine that the first set of inputs represent a first multi-frame request, where the user provides a series of inputs that are expected to produce a continuous response. A first multi-frame edit task can then be generated that includes a communications channel between the primary thread and a background thread for caching the first set of inputs. The first multi-frame edit task is then enqueued in a task queue of the background thread. When the background thread become available to process the first multi-frame edit task, the background thread dequeues the communications channel from the task queue and replays the first set of inputs from the communications channel to generate an output that can be displayed on the graphical user interface.

In some embodiments, the primary thread of a digital design system can further receive a second set of inputs on the graphical user interface, where at least one input of the second set of inputs is received concurrently with at least one input of the first set of inputs. When the second set of inputs represent a second multi-frame edit request, the primary thread can generate a second multi-frame edit task that includes a second communications channel caching the second set of inputs. The second multi-frame edit task is then enqueued in the task queue of the second thread.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
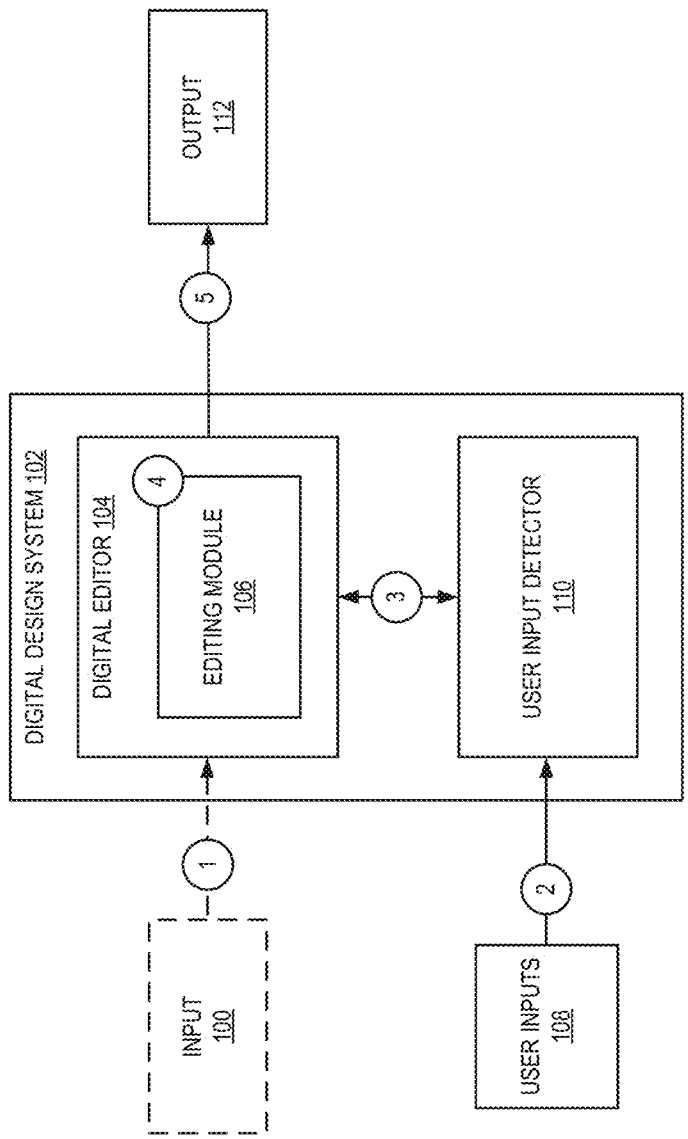
FIG. 1 illustrates a diagram of a process of performing multi-frame editing in a digital design system in accordance with one or more embodiments.

One or more embodiments of the present disclosure include a digital design system for processing multi-frame edits on a digital image in a synchronous manner between largely asynchronous primary and background threads. Multi-frame edits include a series of user inputs that produce a continuous response. Examples of multi-frame edits including dragging an object across a canvas, modifying the geometry of an object, modifying the appearance of an object (e.g., by dragging handles in a color selector). While many systems can perform both discrete and multi-frame edits, they have their disadvantages.

For example, some existing systems perform multi-frame edits on a primary thread. While this implicitly ensures synchronous response, due to imbalance in the speed of user input typically being fast and back-end processing typically being slow, sustaining a real-time response becomes challenging. An extreme manifestation of this challenge occurs where very slow back-end operations (e.g., due to operations being performed on complex artwork) block the application's primary thread (as that is also handling processing of multi-frame edits) and the operating system displaying an "Application Not Responding" message. As a result, users often resort to forcibly killing the application, which increases the application crash rate and builds negative user perception.

Other existing systems do not perform multi-frame edits on the primary thread, but instead process them as a series of discrete events on a background thread. However, these systems can produce other problems, including that if different user inputs for different multi-frame edits are performed even partially concurrently, the inputs for the different multi-frame edits can interleave, resulting in the incorrect performance of user inputs. Also, performing heavy operations can result in these systems blocking or losing some user inputs, resulting in imperfections in the visual display. For example, when users inputs are performed to create a drawing on the user interface, losing any of the user inputs can result in an incomplete drawing being performed by these existing systems.

Yet other existing systems take a different approach. In one existing solution, during the time a multi-frame edit is underway, the application temporarily blocks their entire user interface (UI) (except the canvas that keeps accepting further events for the on-going multi-frame edit) and the user is not permitted to make any other interaction (even as simple as color change). In such systems, a busy waiting spinner is sometimes displayed while the user interface is unavailable to accept new operations/inputs.

To address these issues, after receiving a first set of user inputs, the digital design system determines whether the first set of user inputs is indicative of a discrete or multi-frame edit request. When the first set of user inputs is a discrete edit request, the digital design system queues the first set of user inputs in a task queue of a background thread. When the first set of user inputs is a multi-frame edit request, the digital design system generates a multi-frame edit task that includes a communications channel between the main thread and the background thread for caching the first set of user inputs for the multi-frame edit request. The communications channel can be embodied as a full-duplex communications channel, bi-directional pipe, shared memory, file, cache, two in-memory buffers, etc. The communications channel stores the first set of user inputs for the multi-frame edit request, maintaining the first set of user inputs in the order the first set of user inputs were received. The digital design system then queues the multi-frame edit task in the task queue of the background thread. When the background thread dequeues the multi-frame edit task from the task queue, the background thread initiates a handshake with the main thread and begins processing the first set of user inputs in the order they were received.

By caching or storing the user inputs for a multi-frame edit in a communications channel, in the order they were received, for later replay by the background thread in that order, the digital design system can bring transient synchronous behavior among largely asynchronous primary and background threads. Further, if the primary and the background threads are both available when user inputs for a multi-frame edit are received, the user inputs can be processed by the background thread in a nearly synchronized manner.

FIG. 1 illustrates a diagram of a process of performing multi-frame editing in a digital design system in accordance with one or more embodiments. As shown in FIG. 1, in one or more embodiments, a digital design system 102 optionally receives an input 100, as shown at numeral 1. In one or more embodiments, the input 100 can be an image, a vector art or other graphics file, a document, etc. For example, the digital design system 102 receives an image from a user via a computing device. In one example, a user may select an image in a document processing application or an image processing application. In another example, a user may submit an image to a web service or an application configured to receive images as inputs. The input 100 can also be a document, such as an existing workspace (e.g., from a memory or storage). In one or more embodiments, the digital design system 102 includes a digital editor 104 that receives the input 100. In one or more other embodiments, instead of receiving the input 100, the digital design system 102 can display a workspace.

In one or more embodiments, the digital design system 102 receives user inputs 108, as shown at numeral 2. As shown in FIG. 1, the digital design system 102 can include a user input detector 110 that receives the user inputs 108. The user input detector 110 detects, receives, and/or facilitates user input in any suitable manner. In some examples, the user input detector 110 detects one or more user interactions. As referred to herein, a "user interaction" means a single input, or combination of inputs, received from a user by way of one or more input devices (e.g., a mouse, stylus, touchpad, etc.), or via one or more touch gestures. A user interaction can have variable duration and may take place relative to a display provided on a touch screen.

For example, the user input detector 110 can detect a touch gesture performed on a touch screen. As used herein the term "touch gesture" refers to one or more motions or actions performed relative to a touch screen. For example, a touch gesture can comprise one or more fingers touching, sliding along, or otherwise interacting with a touch screen. In alternative embodiments, a touch gesture can comprise another object, such as a stylus, touching or otherwise interacting with a touch screen. Example touch gestures include a tap, a double-tap, a press-and-hold (or long press), a scroll, a pan, a flick, a swipe, a multi-finger tap, a multi-finger scroll, a pinch close, a pinch open, and a rotate. Although specific touch gestures are discussed in some embodiments described herein, these gestures are only examples, and other embodiments can use different touch gestures to perform the same operations in the digital design system. Users can perform touch gestures with a single hand or multiple hands. For example, a user may use two or more fingers of both hands to perform a touch gesture. Alternative embodiments may include other more complex touch gestures that include multiple fingers of both hands.

The user input detector 110 can further detect one or more user inputs provided by a user by way of a touch gesture, stylus, or input device on a user interface. In some examples, the user input detector 110 can detect user inputs in relation to and/or directed at one or more display elements displayed as part of a user interface presented on a computing device.

The user input detector 110 may additionally, or alternatively, receive data representative of a user interaction. For example, the user input detector 110 may receive one or more user configurable parameters from a user, one or more commands from the user, and/or any other suitable user input. In particular, the user input detector 110 can receive voice commands or otherwise sense, detect, or receive user input.

The user input detector 110 can then send the user input information to a digital editor 104 to process the user inputs 108, as shown at numeral 3. In one or more embodiments, the digital editor 104 determines whether the first set of user inputs is indicative of a discrete edit request or a multi-frame edit request. In one or more embodiments, the digital editor 104 determines whether the request is a discrete edit request or a multi-frame edit request based on the amount of movement, the duration, the velocity, and/or the pressure of the interaction. Examples of multi-frame edit requests can include dragging an object across a canvas, swiping across a canvas (e.g., using a drawing tool), modifying the geometry (e.g., size, shape, etc.) of an object, modifying the appearance of an object (e.g., by dragging handles in a color selector).

When the digital editor 104 determines that the user inputs 108 are indicative of a multi-frame edit request, an editing module 106 generates a multi-frame edit task, as shown at numeral 4. The editing module 106 can include a primary thread for providing a user interface and receiving user inputs, and a background thread for processing user inputs. In one or more embodiments, the editing module 106 generates a communications medium associated with the multi-frame edit task for caching/store the user inputs as they are received, in the order the user inputs were received by the digital design system 102.

The editing module 106 then sends the multi-frame edit task to the background thread for processing. In one or more embodiments, if the background thread is currently processing another task, the multi-frame edit task is added to the task queue for the background thread. In one or more other embodiments, the multi-frame edit task is added to the task queue regardless of whether the background thread is currently processing another task. In such embodiments, if the background thread is available, the multi-frame edit task can be immediately dequeued for processing. Embodiments in which tasks are automatically queued regardless of the state of the background thread allow the primary thread to conserve resources that would otherwise be tasked with determining the state of the background thread.

In one or more embodiments, when the multi-frame edit task is in the task queue, the primary thread can continue to send user inputs associated with the multi-frame edit request to the background thread for storage in the communications medium. Further, the primary thread can continue to send user inputs associated with the multi-frame edit request to the background thread even as the background thread begins processing the multi-frame edit task.

In one or more embodiments, when multi-frame edit task is added to the task queue, a pointer to a memory location for the communications mediums is stored in the task queue. In one or more embodiments, when the multi-frame edit task is dequeued from the task queue for processing by the background thread, the background thread begins processing the user inputs 108. In one or more embodiments, the user inputs are replayed in the order they were received. This ensures that when the user inputs are processed, they are processed in the correct order and as they would have been if they had been processed immediately upon being received by the digital design system 102.

At numeral 5, the digital design system 102 can display the output 112 to the user. For example, after the process described above in numerals 1-4, the requested edit to the input 100 can be displayed in the user interface. In one or more embodiments, the output 112 can result in the display of a modification to an object in the input 100 (e.g., moved to a new location on the user interface, modification the geometry or appearance of the object, etc.), a modification causing the addition or removal of an element in the input 100, etc.

Figure 2:
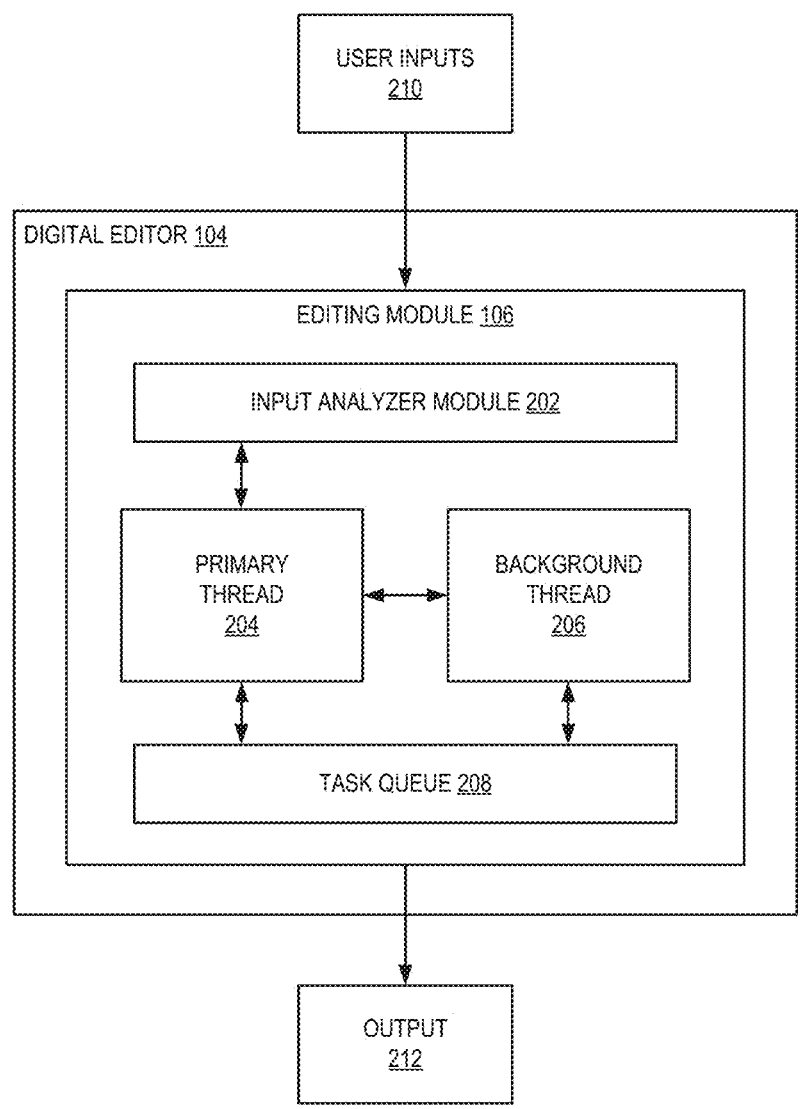
FIG. 2 illustrates a diagram of an example digital editor in accordance with one or more embodiments.

FIG. 2 illustrates a diagram of an example digital editor in accordance with one or more embodiments. In FIG. 2, the digital editor 104 includes an editing module 106. In other embodiments, the digital editor 104 may include more or fewer modules than illustrated in FIG. 2.

As illustrated in FIG. 2, when the digital editor 104 receives user inputs 210, the user inputs are provided to an input analyzer module 202 of an editing module 106. In one or more embodiments, the digital editor 104 receives the user inputs 210 from a user input detector. In one or more embodiments, the input analyzer module 202 is configured to analyze the user inputs 210 to determine whether the user inputs 210 are indicative of a discrete edit request or a multi-frame edit request. For example, the input analyzer module 202 can determine whether the user inputs 210 are indicative of a discrete edit request or a multi-frame edit request based on an amount of movement involved in the interaction, the rate of movement in the interaction, the amount of time of the interaction, and/or the type of interaction. For example, a tap gesture could be indicative of a discrete edit request, while a drag gesture could be indicative of a multi-frame edit request.

Discrete edit requests include user inputs in where asynchronous response is acceptable. Examples of discrete edit requests include a tap or selection user input on an object, button, etc. In contrast, multi-frame edit requests include user inputs in which the user inputs include a series of steps and a continuous response is desired or expected. Examples of multi-frame edit requests include dragging an object on canvas, modifying the geometry of an object through the exposed decorations (or views), modifying the appearance of an object by dragging handles in a color picker, etc. These and other examples of multi-frame edit requests typically include a starting state (e.g., position, shape, color, size, etc.), and a series of intermediate views depicted on a user interface until an ending state is achieved.

After the input analyzer module 202 determines the type of request in the user inputs 210, the input analyzer module 202 can tag the request with a request type indicator (e.g., that indicates whether the user inputs 210 are for a discrete or multi-frame edit request).

In one or more embodiments, a primary thread 204 can be configured to execute the code for generating the graphical user interface and receive user inputs after they have been analyzed by the input analyzer module 202. The primary thread 204 can further be configured to send received user inputs to the background thread 206. In one or more embodiments, the background thread 206 is a worker thread configured to process the user inputs received by the primary thread 204. In one or more embodiments, the background thread 206 operates with a queue system where the primary thread 204 enqueues its received edit requests and allows asynchronous sequential execution of these edit requests. For example, the primary thread 204 can generate a discrete edit task or a multi-frame edit task based on the user inputs 210 and send the generated edit task to the background thread 206. In one or more embodiments, when the background thread 206 is busy processing previously received tasks, the edit task is stored in a task queue 208 for later processing. In one or more other embodiments, the edit task is stored in the task queue 208 regardless of whether the background thread 206 is busy processing previously received tasks. When the inputs are for a multi-frame edit request, the primary thread 204 generates a multi-frame edit task that includes a communications medium between the primary thread 204 and the background thread 206. In one or more embodiments, the primary thread 204 sends the user inputs 210 as they are received to the communications medium for storage and subsequent replay in the order they were received.

When the background thread 206 is available for processing, the next edit task in the task queue 208 is dequeued for processing. When the background thread 206 begins processing the multi-frame edit task, the background thread 206 begins to process the user inputs 210 in the order they were received and displays the output 212 in the digital editor 104.

Figure 3:
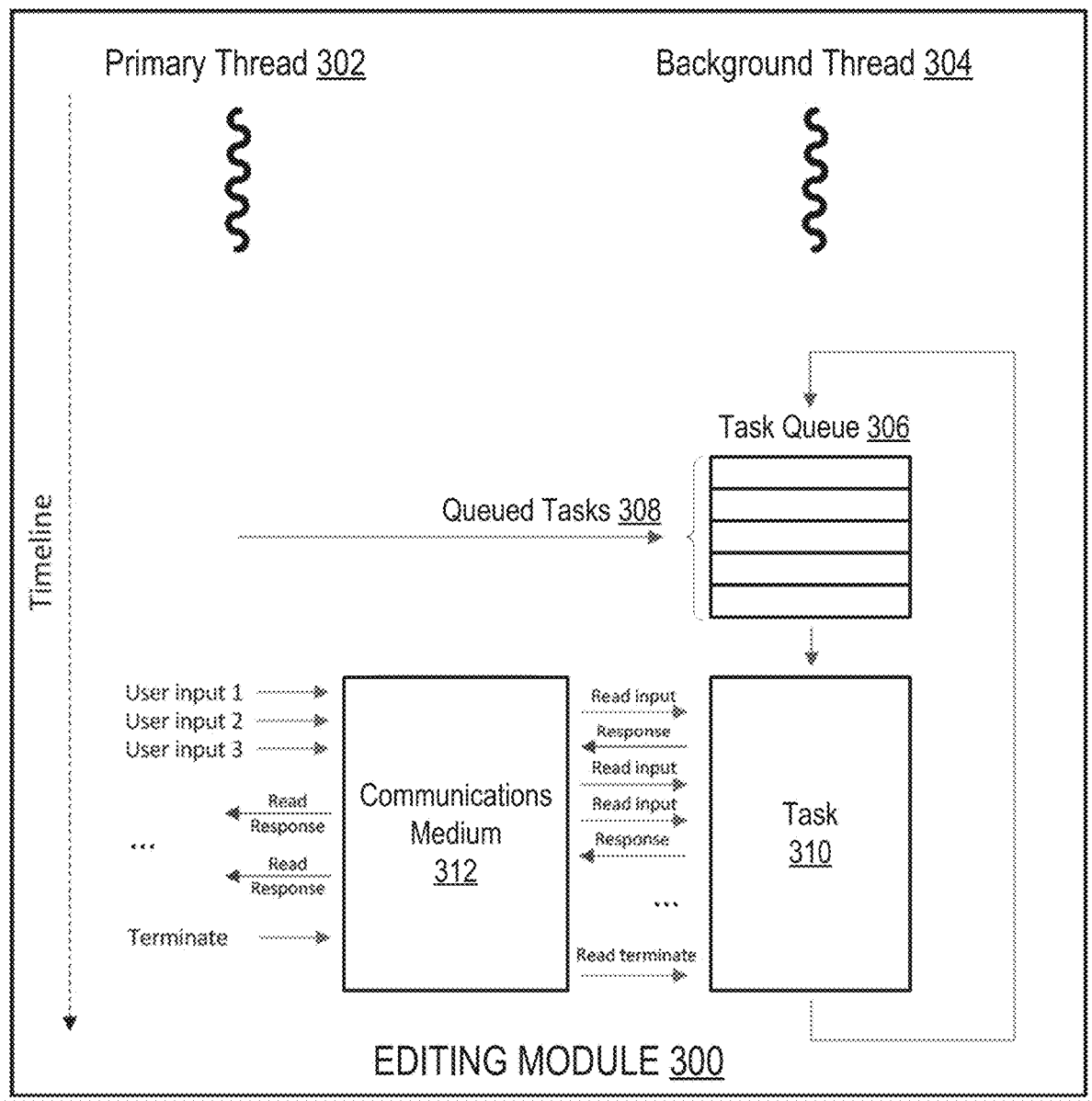
FIG. 3 illustrates a process of an editing module processing a multi-frame edit task in accordance with one or more embodiments.

FIG. 3 illustrates a process of an editing module processing a multi-frame edit task in accordance with one or more embodiments. As shown, an editing module 300 includes a primary thread 302 and a background thread 304. In one or more embodiments, the primary thread 302 is configured to execute the code for generating the graphical user interface and receive user inputs, while the background thread 304 is configured to process the user inputs and generate at least one output. In one or more embodiments, as the primary thread 302 sends edit tasks to the background thread 304, the background thread 304 processes the user inputs in the edits tasks and returns the output of the edit tasks to the primary thread 302. In one or more embodiments, if the background thread 304 is currently processing another task, edit tasks are added to a task queue 306 for the background thread 304. In one or more other embodiments, edit tasks are added to a task queue 306 for the background thread 304 regardless of whether the background thread 304 is currently processing another task. In one or more embodiments, each of the queued tasks 308 in the task queue 306 can include a pointer to a portion of memory storing the corresponding user inputs for the edit task.

As illustrated in FIG. 3, task 310 has been dequeued from the task queue 306 for processing by the background thread 304. Task 310 is a multi-frame edit task. In one or more embodiments, task 310 includes a pointer to a stored communications medium 312 configured to send and receive data between the primary thread 302 and the background thread 304. In one or more embodiments, the communications medium 312 is one of a full-duplex communications channel, pipe, shared memory, file, cache, two in-memory buffers. In one or more embodiments, the communications medium 312 stores a set of user inputs previously received by the primary thread 302.

In one or more embodiments, the set of user inputs are stored in the order the set of user inputs were received to allow for the set of user inputs to be processed by the background thread 304 in a same manner as they would have been processed if the set of user inputs were processed immediately upon being received. For example, when the background thread 304 begins processing task 310, the background thread reads user input 1, processes user input 1, and returns a response through the communications medium 312 that is read by the primary thread 302. The primary thread 302 can then provide the output on the user interface. As illustrated in FIG. 3, the background thread similarly received user input 2 and user input 3 and provides a response that is received by the primary thread 302. In one or more embodiments, this process continues until the background thread 304 processed a terminate indication or message. In response to receiving the terminate indication or message, the background thread 304 stops processing task 310. In one or more embodiments, the background thread 304 further terminates the communications medium 312.

When the background thread 304 completes the processing of task 310, the background thread 304 dequeues the next of the queued task 308 in the task queue 306 for processing. For example, the background thread 304 dequeues the oldest task in the task queue 306.

Figure 4:
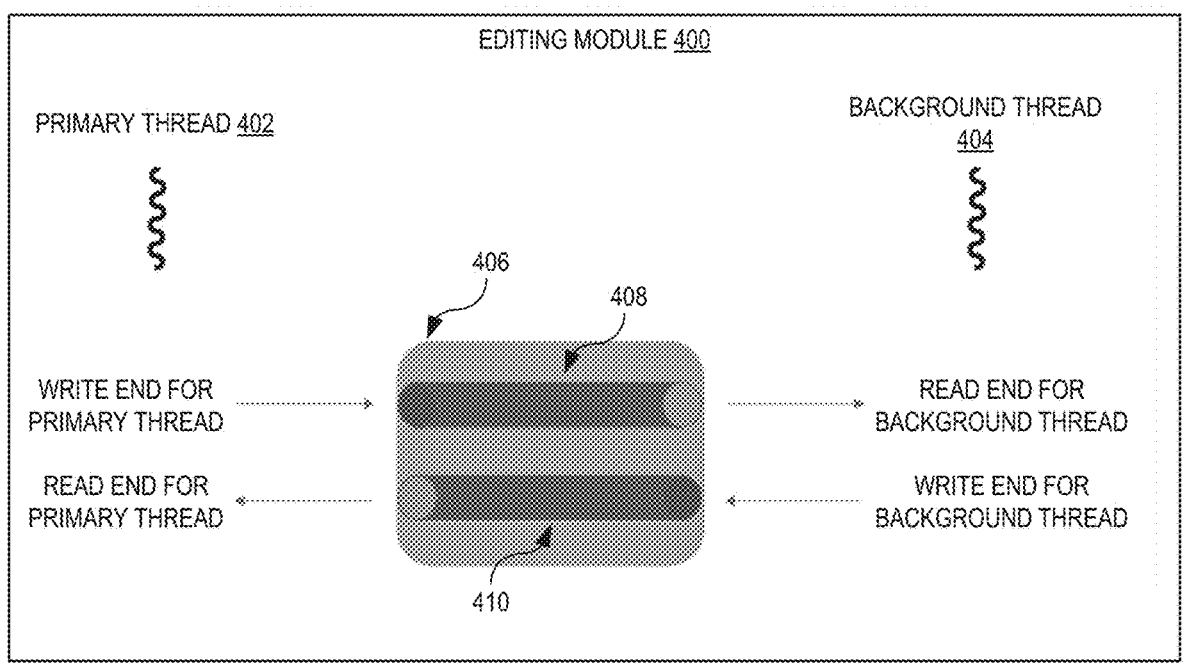
FIG. 4 illustrates an example communications medium between a primary thread and a background thread in accordance with one or more embodiments.

FIG. 4 illustrates an example communications medium between a primary thread and a background thread in accordance with one or more embodiments. As shown, an editing module 400 includes a primary thread 402 and a background thread 404. When the editing module 400 receives user inputs indicative of a multi-frame edit request at the primary thread 402, a multi-frame edit task is created. In one or more embodiments, the multi-frame edit task includes the communication medium 406. As illustrated in FIG. 4, the communications medium 406 can include a set of bi-directional pipes that facilitate the sending of information between the primary thread 402 and the background thread 404. In other embodiments, the communications medium 406 can be a cache, a file, a shared memory, two in-memory buffers, etc.

When the background thread 404 is processing discrete requests or other multi-frame edit requests, the multi-frame edit task containing the corresponding inputs is queued in a task queue. In one or more embodiments, when the multi-frame edit task is dequeued from the task queue for processing by the background thread 404, the background thread 404 begins to process the inputs as cached in the communications medium 406. In one or more embodiments, the background thread 404 can process the multi-frame edit task nearly synchronously with the primary thread 402 receiving the user inputs when the background thread 404 is free when the user inputs were received. If the background thread 404 was busy when the multi-frame edit task was received, the background thread 404 can process the multi-frame edit task asynchronously with the primary thread 402 receiving the user inputs, either while receiving user inputs for the multi-frame edit task or after all of the user inputs for the multi-frame edit task have been cached.

As illustrated in FIG. 4, each thread has access to a read end and a write end of the communications medium 406, where a read end for one thread is connected to a write end for the other thread. For example, the primary thread 402 writes to the write end of pipe 408 and the background thread 404 sequentially reads from the read end of the pipe 408. Similarly, the background thread 404 writes data to the write end of pipe 410 and primary thread 402 reads in-order from the read end of the pipe 410. The process goes on until the primary thread 402 writes a terminating sentinel value (e.g., at the end of multi-frame edit task) to the write end of the pipe 408. Upon reading the terminating sentinel value, the background thread 404 thread can terminate its processing. When both the primary thread 402 and the background thread 404 finish reading off data from the pipes in the communications medium 406, the communications medium 406 is terminated.

Figure 5:
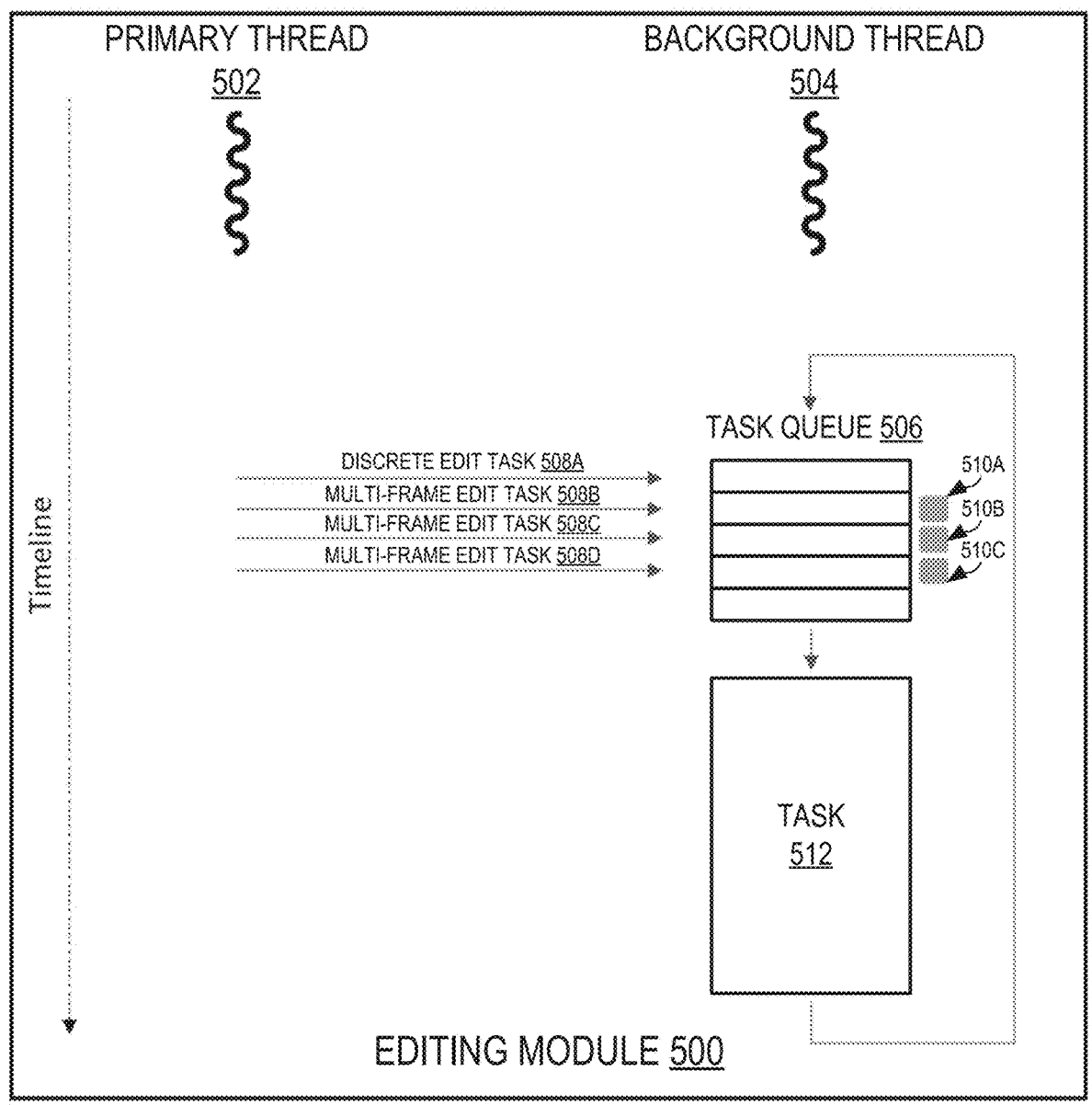
FIG. 5 illustrates a process of an editing module queueing edit tasks in accordance with one or more embodiments.

FIG. 5 illustrates a process of an editing module queueing edit tasks in accordance with one or more embodiments. As shown, an editing module 500 includes a primary thread 502 and a background thread 504. In one or more embodiments, the primary thread 502 is configured to provide a user interface and receive user inputs, while the background thread 504 is configured to process the user inputs and generate outputs. For example, as the primary thread 502 receives a first set of user inputs, the editing module 500 determines whether the first set of user inputs are indicative of a discrete edit request or a multi-frame edit request. When the first set of user inputs is a discrete edit request, a discrete edit task (e.g., 508A) is generated, where the discrete edit task 508A includes the first set of user inputs. In one or more embodiments, the discrete edit task 508A includes a pointer to a location in a memory storing the first set of user inputs. The editing module 500 sends the discrete edit task 508A to the background thread 504 for processing. If the background thread 504 is currently processing another task (e.g., task 512), the discrete edit task 508A is added to a task queue 506 for the background thread 504. In one or more embodiments, the background thread 504 stores a pointer to a portion of memory storing the first set of inputs for the discrete edit task 508A. In other embodiments, the first set of user inputs for the discrete edit task 508A are stored in the task queue 506.

As the background thread receives subsequent discrete edit tasks and/or multi-frame edit tasks, based on the availability of the background thread 504, the subsequent tasks are either queued in the task queue 506 or the background thread 504 begins processing the user inputs. For example, as the primary thread 502 receives a second set of user inputs, the editing module 500 determines whether the second set of user inputs are indicative of a discrete edit request or a multi-frame edit request. When the second set of user inputs is a multi-frame edit request, a multi-frame edit task (e.g., 508B) is generated. The editing module 500 can also generate a communication medium 510A associated with the multi-frame edit task 508B for caching/storing the second set of user inputs in the order the second set of user inputs are received by the primary thread 502 (e.g., as the background thread 504 would have received the second set of inputs had the background thread 504 been free at the time the request was originally submitted). In one or more embodiments, the communications medium 510A is one of a full-duplex communications channel, pipe, shared memory, file, cache, or two in-memory buffers. In one or more embodiments, generating the communications medium 510A can include allocating memory, opening a communications channel or pipe, creating a file, etc. The editing module 500 then sends the multi-frame edit task 508B to the background thread 504 for processing. If the background thread 504 is currently processing another task (e.g., task 512), the multi-frame edit task 508B is added to the task queue 506 for the background thread 504. In one or more embodiments, when multi-frame edit task 508B is added to the task queue 506, a pointer to the communications medium 510A is stored in a memory or storage. In one or more other embodiments, the multi-frame edit task 508B is added to the task queue 506 regardless of whether the background thread 504 is currently processing another task.

As the primary thread 502 receives subsequent inputs indicative of additional multi-frame edit requests, the editing module 500 generates multi-frame edit task 508C and multi-frame edit task 508D. The multi-frame edit tasks 508C and 508D can then be placed in a task queue of the background thread 504. In one or more embodiments, in order to remain non-blocking and progressive, the editing module 500 creates new communications mediums in response to receiving subsequent multi-frame edit requests, and pointers to a memory location for the new communications mediums are stored in the task queue 506 in a manner as described with respect to multi-frame edit tasks 508B. For example, the editing module 500 generates communications medium 510B and communications medium 510C for multi-frame edit task 508C and multi-frame edit task 508D, respectively. Each of communications medium 510B and communications medium 510C can accept the user inputs for their corresponding multi-frame edit request and store them until the background thread 504 becomes available to process the request.

When the background thread 504 completes the processing of task 512, the background thread 504 dequeues the oldest task in the task queue 506 for processing. In the example illustrated in FIG. 5, the background thread 504 dequeues discrete edit task 508A from the task queue 506 for processing. When the next task dequeued from the task queue 506 is a multi-frame edit task (e.g., multi-frame edit task 508B), the background thread 504 obtains the communications medium associated with the multi-frame edit task and begins replaying the user inputs for the multi-frame edit task.

Figure 6:
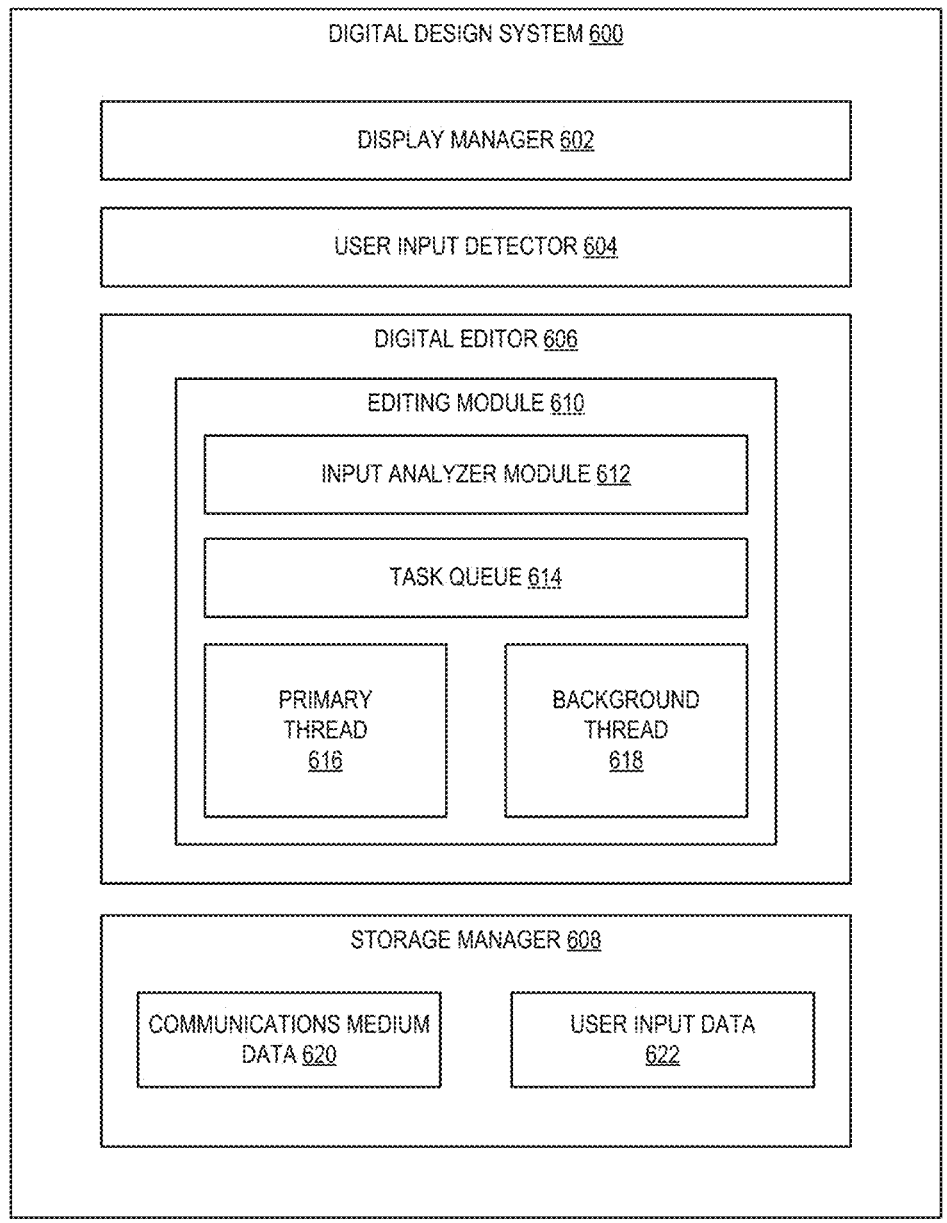
FIG. 6 illustrates a schematic diagram of a digital design system in accordance with one or more embodiments.

FIG. 6 illustrates a schematic diagram of a digital design system (e.g., "digital design system" described above) in accordance with one or more embodiments. As shown, the digital design system 600 may include, but is not limited to, a display manager 602, a user input detector 604, a digital editor 606, and a storage manager 608. As shown, the digital editor 606 includes an editing module 610. The storage manager 608 includes communications medium data 620 and user input data 622.

As illustrated in FIG. 6, the digital design system 600 includes a display manager 602. In one or more embodiments, the display manager 602 identifies, provides, manages, and/or controls a user interface provided on a touch screen or other device. Examples of displays include interactive whiteboards, graphical user interfaces (or simply "user interfaces") that allow a user to view and interact with content items, or other items capable of display on a touch screen. For example, the display manager 602 may identify, display, update, or otherwise provide various user interfaces that contain one or more display elements in various layouts. In one or more embodiments, the display manager 602 can identify a display provided on a touch screen. For example, a display provided on a touch screen may include a graphical user interface including one or more display elements capable of being interacted with via one or more touch gestures or other types of user inputs (e.g., using a stylus, a mouse, or other input devices).

More specifically, the display manager 602 can identify a variety of display elements within a graphical user interface as well as the layout of the graphical user interface. For example, the display manager 602 may identify a graphical user interface provided on a touch screen including one or more display elements. Display elements include, but are not limited to buttons, text boxes, menus, thumbnails, scroll bars, hyperlinks, etc. In one or more embodiments, the display manager 602 can identify a graphical user interface layout as well as the display elements displayed therein.

As further illustrated in FIG. 6, the digital design system 600 also includes a user input detector 604. In one or more embodiments, the user input detector 604 detects, receives, and/or facilitates user input in any suitable manner. In some examples, the user input detector 604 detects one or more user interactions. As referred to herein, a "user interaction" means a single input, or combination of inputs, received from a user by way of one or more input devices, or via one or more touch gestures. A user interaction can have variable duration and may take place relative to a display provided on a touch screen.

For example, the user input detector 604 can detect a touch gesture performed on a touch screen. In particular, the user input detector 604 can detect one or more touch gestures (e.g., tap gestures, swipe gestures, pinch gestures) provided by a user by way of the touch screen. In some embodiments, the user input detector 604 can detect touch gestures based on one point of contact or multiple points of contact on the touch screen. In some examples, the user input detector 604 can detect touch gestures in relation to and/or directed at one or more display elements displayed as part of a display presented on the touch screen.

The user input detector 604 may additionally, or alternatively, receive data representative of a user interaction. For example, the user input detector 604 may receive one or more user configurable parameters from a user, one or more commands from the user, and/or any other suitable user input. In particular, the user input detector 604 can receive voice commands or otherwise sense, detect, or receive user input.

As further illustrated in FIG. 6, the digital design system 600 also includes a digital editor 606. In one or more embodiments, the digital editor 606 provide digital image-editing functions, including drawing, painting, measuring and navigation, selection, typing, and retouching. In one or more embodiments, the digital editor 606 utilizes the inputs (e.g., touch gestures) received by the user input detector 604 to cause an editing module 610 to process user inputs performed on the touch screen and generate an output.

As illustrated in FIG. 6, the digital editor 606 includes an editing module 610 that includes an input analyzer module 612, a task queue 614, a primary thread 616, and a background thread 618. In one or more embodiments, the input analyzer module 612 analyzes received user inputs to determine whether the user inputs are indicative of a discrete edit request or a multi-frame edit request. In one or more embodiments, the input analyzer module 612 determines whether the user inputs are indicative of a discrete edit request or a multi-frame edit request based on the amount of movement, the duration, the velocity, and/or the pressure of the interaction. Examples of discrete edit requests include a tap or selection user input on a user interface element such as an object, button, etc. Examples of multi-frame edit requests can include dragging an object across a canvas, swiping across a canvas (e.g., using a drawing tool), modifying the geometry (e.g., size, shape, etc.) of an object, modifying the appearance of an object (e.g., by dragging handles in a color selector).

In one or more embodiments, the task queue 614 is an object storing ordered tasks. In one or more embodiments, new tasks received by the background thread 618 are stored in the task queue 614 for processing when the background thread 618 is available. In one or more embodiments, task are queued in the task queue 614 in the order they are received. In one or more embodiments, each entry in the task queue 614 includes a pointer to a storage location in storage manager 608. For example, the task queue 614 can store a pointer to a location in communications medium data 620 and/or user input data 622 for a multi-frame edit task.

In one or more embodiments, the primary thread 616 and the background thread 618 are separate processing threads that work cooperatively to receive and process user inputs. In one or more embodiments, the primary thread 616 can be configured to execute the code for generating the graphical user interface and receive user inputs performed using a graphical user interface. The primary thread 616 can further be configured to send received user inputs to the background thread 618. In one or more embodiments, the background thread 618 can be a worker thread configured to process the user inputs received by the primary thread 616. In one or more embodiments, the background thread 618 operates with a queue system where the primary thread 616 enqueues its edit requests and allows asynchronous sequential execution of these edit requests. Offloading the bulk of the user input processing to the background thread 618 can keep the digital design system 600 responsive (e.g., as receiving user inputs can be handled by a relatively free primary thread 616).

In one or more other embodiments, the editing module 610 can include additional threads, in addition to the primary thread 616 and the background thread 618. In such embodiments, different user inputs can be queued for subsequent processing by the additional threads in the same manner as described with respect to embodiments with only the primary thread 616 and the background thread 618.

As further illustrated in FIG. 6, the storage manager 608 includes communications medium data 620 and user input data 622. In particular, the communications medium data 620 may include any information for establishing a communications medium between the primary thread 616 and the background thread 618 of the editing module 610. For example, when the background thread 618 dequeues a multi-frame edit task from the task queue 614, the digital design system 600 can access the communications medium data 620 to retrieve information for establishing a communications channel, a location in a shared memory, etc.

In one or more embodiments, the user input data 622 can store received user inputs for discrete edit requests and multi-frame edit requests. For example, when the background thread 618 dequeues a task from the task queue 614, the task may include a pointer to the user input data 622 that points to the location storing the user inputs associated with the dequeued task.

Each of the components 602-608 of the digital design system 600 and their corresponding elements (as shown in FIG. 6) may be in communication with one another using any suitable communication technologies. It will be recognized that although components 602-608 and their corresponding elements are shown to be separate in FIG. 6, any of components 602-608 and their corresponding elements may be combined into fewer components, such as into a single facility or module, divided into more components, or configured into different components as may serve a particular embodiment.

The components 602-608 and their corresponding elements can comprise software, hardware, or both. For example, the components 602-608 and their corresponding elements can comprise one or more instructions stored on a computer-readable storage medium and executable by processors of one or more computing devices. When executed by the one or more processors, the computer-executable instructions of the digital design system 600 can cause a client device and/or a server device to perform the methods described herein. Alternatively, the components 602-608 and their corresponding elements can comprise hardware, such as a special purpose processing device to perform a certain function or group of functions. Additionally, the components 602-608 and their corresponding elements can comprise a combination of computer-executable instructions and hardware.

Furthermore, the components 602-608 of the digital design system 600 may, for example, be implemented as one or more stand-alone applications, as one or more modules of an application, as one or more plug-ins, as one or more library functions or functions that may be called by other applications, and/or as a cloud-computing model. Thus, the components 602-608 of the digital design system 600 may be implemented as a stand-alone application, such as a desktop or mobile application. Furthermore, the components 602-608 of the digital design system 600 may be implemented as one or more web-based applications hosted on a remote server. Alternatively, or additionally, the components of the digital design system 600 may be implemented in a suit of mobile device applications or "apps." To illustrate, the components of the digital design system 600 may be implemented in a document processing application or an image processing application, including but not limited to ADOBE® Acrobat, ADOBE® Photoshop, and ADOBE® Illustrator. "ADOBE®" is either a registered trademark or trademark of Adobe Inc. in the United States and/or other countries.

Figure 7:
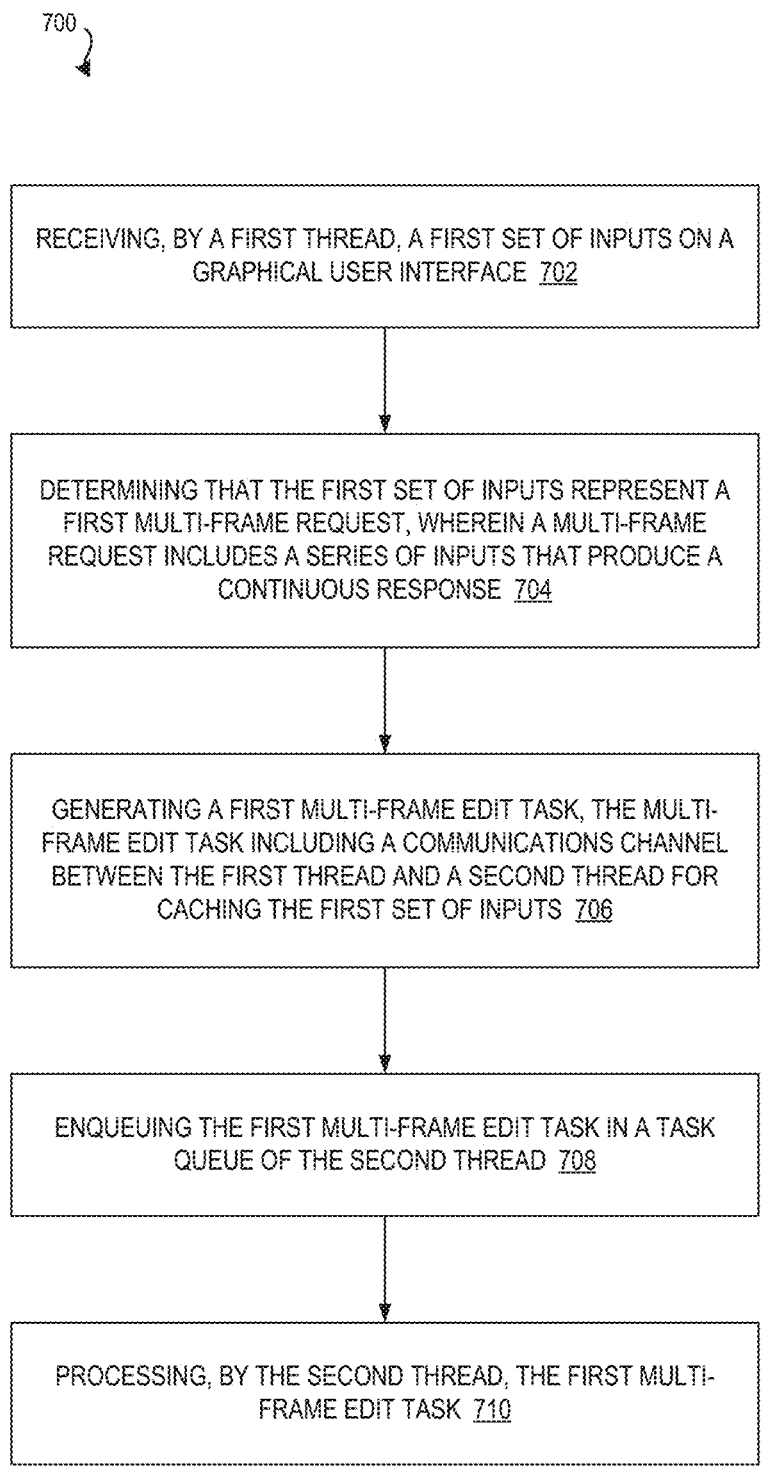
FIG. 7 illustrates a flowchart of a series of acts in a method of multi-frame editing in a digital design system in accordance with one or more embodiments.

FIGS. 1-6, the corresponding text, and the examples, provide a number of different systems and devices that allows a multi-threaded digital design system to perform multi-frame editing. In addition to the foregoing, embodiments can also be described in terms of flowcharts comprising acts and steps in a method for accomplishing a particular result. For example, FIG. 7 illustrates a flowchart of an exemplary method in accordance with one or more embodiments. The method described in relation to FIG. 7 may be performed with less or more steps/acts or the steps/acts may be performed in differing orders. Additionally, the steps/acts described herein may be repeated or performed in parallel with one another or in parallel with different instances of the same or similar steps/acts.

FIG. 7 illustrates a flowchart of a series of acts in a method of multi-frame editing in a digital design system in accordance with one or more embodiments. In one or more embodiments, the method 700 is performed in a digital medium environment that includes the digital design system 600. In one or more embodiments, the method 700 is performed after the digital design system 600 obtains an image. For example, the digital design system can receive the image from a user (e.g., via a computing device). A user may select an image in a document processing application or an image processing application, or the user may submit an image to a web service or an application configured to receive images as inputs. In one or more other embodiments, the method 700 is performed after the digital design system 600 receives a selection of a new or existing workspace or canvas.

The method 700 is intended to be illustrative of one or more methods in accordance with the present disclosure and is not intended to limit potential embodiments. Alternative embodiments can include additional, fewer, or different steps than those articulated in FIG. 7.

As shown in FIG. 7, the method 700 includes an act 702 of receiving, by a first thread, a first set of inputs on a graphical user interface. In one or more embodiments, the first thread is a primary thread of the digital design system. In such embodiments, the first thread can be configured to provide the graphical user interface and receive user inputs performed using the graphical user interface. The first thread can further be configured to send received user inputs to a second thread. In one or more embodiments, the second thread is a background thread configured to process the user inputs received by the first thread.

In one or more embodiments, the digital design system detects the first set of inputs (e.g., touch gestures, input from input device, etc.) indicating an edit request on the graphical user interface. For example, the digital design system can detect a tap, swipe, selection, or other input, on the graphical user interface that interacts with a display element (e.g., object, button, icon, menu option, etc.).

As shown in FIG. 7, the method 700 also includes an act 704 of determining that the first set of inputs represent a first multi-frame request. In one or more embodiments, a multi-frame request includes a series of inputs that produce a continuous response. Examples of multi-frame requests include dragging an object on a canvas, modifying the geometry (e.g., shape or size) of an object, modifying the appearance of an object by dragging handles in color picker, etc. In one or more embodiments, in response to receiving the first set of inputs, the digital design system determines whether the first set of inputs are indicative of a discrete request or a multi-frame request based on the duration of the interactions producing the first set of inputs and/or based on the distance the interactions traverse on the user interface. In one or more embodiments, interactions performed over a threshold amount of time can be indicative of a multi-frame request, while interactions performs below the threshold amount of time can be indicative of a discrete request. Similarly, interactions that are performed over a threshold distance on the user interface can be indicative of a multi-frame request, while interactions that are performed below the threshold distance on the user interface can be indicative of a discrete request.

As shown in FIG. 7, the method 700 also includes an act 706 of generating a first multi-frame edit task. In one or more embodiments, first multi-frame edit task includes a communications channel between the first thread and a second thread for caching the first set of inputs. In one or more embodiments, the communication channel can be one of a full-duplex communications channel, a pipe, a shared memory, a file, a cache, and two in-memory buffers.

As shown in FIG. 7, the method 700 also includes an act 708 of enqueuing the first multi-frame edit task in a task queue of the second thread. In one or more embodiments, when the digital design system determines that the second thread is currently processing an edit task (e.g., a previous discrete or multi-frame request), the first multi-frame edit task is placed into the task queue for processing by the second thread. In one or more other embodiments, the first multi-frame edit task is placed into the task queue for processing by the second thread regardless of whether the second thread is currently processing an edit task.

In one or more embodiments, the first thread can continue to send user inputs associated with the edit request for caching in the communications channel after the first multi-frame edit task is enqueued in the task queue.

As shown in FIG. 7, the method 700 also includes an act 710 of processing, by the second thread, the first multi-frame edit task. In one or more embodiments, when the digital design system determines that the second thread is not currently processing an edit task, the digital design system can begin processing the first set of inputs to generate at least one output. In one or more embodiments, processing the first set of inputs includes dequeuing the communications channel associated with the first multi-frame request from the task queue and replaying the first set of inputs from the communications channel. In one or more embodiments, the digital design system replays the first set of inputs from the communications channel in the order that they were originally received by the first thread.

In one or more embodiments, the digital design system processes the first set of inputs for the first multi-frame edit task until the digital design system processes a terminating sentinel value. In response to the processing the terminating sentinel value, the digital design system terminates the communications channel between the first thread and the second thread, associated with the first multi-frame edit task.

In one or more embodiments, when the digital design system begins processing the first multi-frame edit task, the digital design system further determines whether the first set of inputs in the first multi-frame edit task indicate a task type where a final input in the first set of inputs defines the first multi-frame edit task. Examples of such task types include dragging or scaling an object. In such task types, when the first multi-frame edit task is one of these task types, the digital design system can skip or bypass one or more of the intermediate user inputs between the initial user input and the final user input to produce the final output (e.g., the final location or final size/shape of the object). In contrast, task types in which intermediate user inputs typically cannot be skipped include drawing tasks.

In one or other embodiments, the digital design systems can receive a second set of inputs at least partially concurrently while receiving the first set of inputs (e.g., two different user interactions), or while the first multi-frame edit task is queued in the task queue or being processed by the second thread. In such embodiments, when the second set of inputs represent a second multi-frame edit request, the digital design system can generate a second multi-frame edit task that includes the second set of inputs. In one or more embodiments, the digital design system further creates a second communications channel between the first thread and the second thread for caching the second set of inputs. The digital design system can then queue the second multi-frame edit task in the task queue of the second thread for later processing. The ability to create and queue multiple multi-frame edit tasks in the task queue prevents the loss of user inputs, even if the second thread is busy processing a previous edit task.

For example, subsequent to performing a multi-frame edit task, the digital design system can receive a request to undo the multi-frame edit task. In one or more embodiments, the request to undo the multi-frame edit task can be received as a user input (e.g., command, selection, etc.). In one or more embodiments, the digital editor can retrieve the set of inputs performed to process the multi-frame edit task from the communications channel associated with the multi-frame edit task and undo the multi-frame edit task. For example, the digital editor can process/perform the set of inputs in the reverse order that they were previously performed to undo the multi-frame edit task. In one or more other embodiments, because user inputs for multi-frame requests are performed without being interleaved with other user inputs, the digital editor can perform an undo operation by reverting to a state before the multi-frame edit task was performed.

Figure 8:
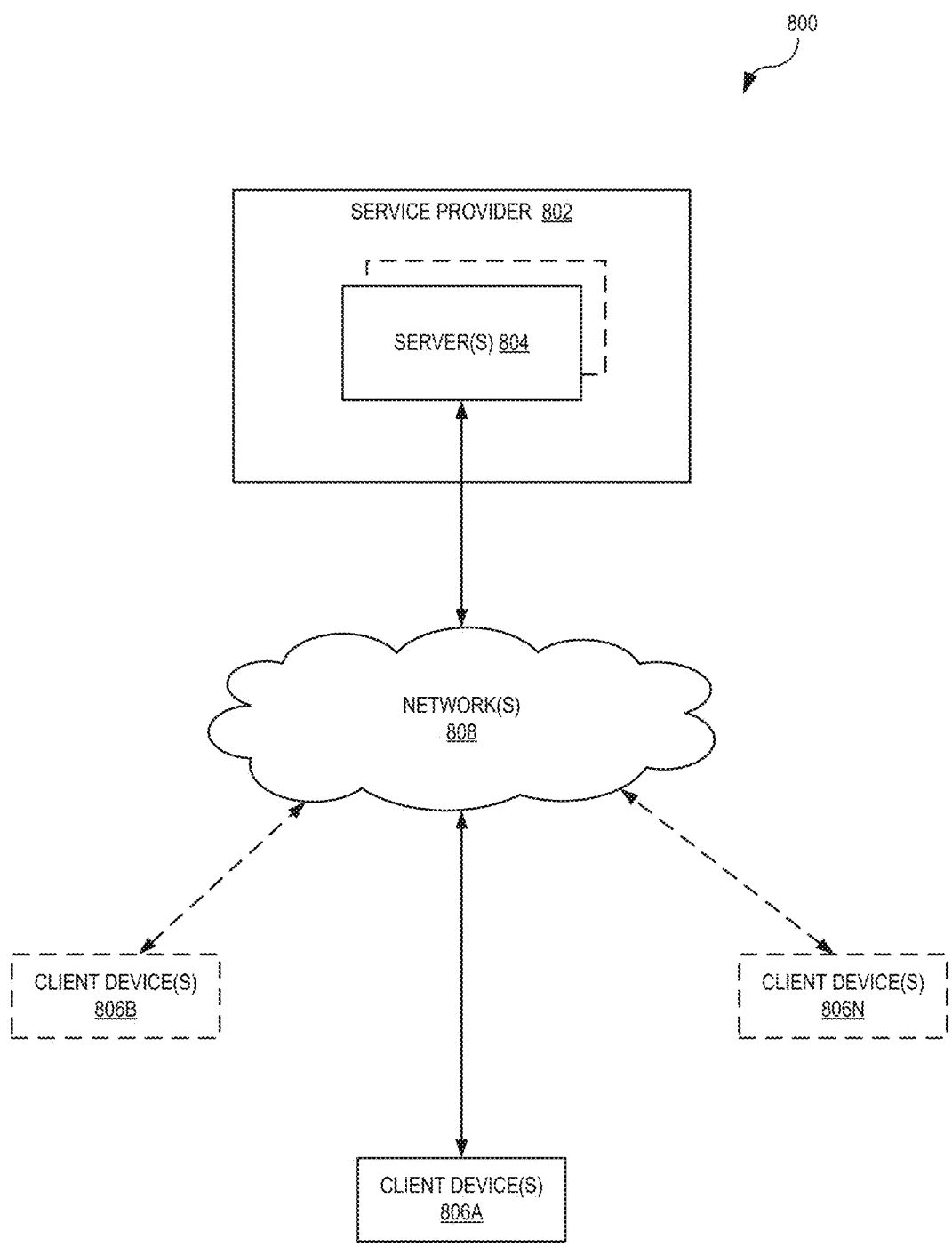
FIG. 8 illustrates a schematic diagram of an exemplary environment in which the digital design system can operate in accordance with one or more embodiments.

FIG. 8 illustrates a schematic diagram of an exemplary environment 800 in which the digital design system 600 can operate in accordance with one or more embodiments. In one or more embodiments, the environment 800 includes a service provider 802 which may include one or more servers 804 connected to a plurality of client devices 806A-806N via one or more networks 808. The client devices 806A-806N, the one or more networks 808, the service provider 802, and the one or more servers 804 may communicate with each other or other components using any communication platforms and technologies suitable for transporting data and/or communication signals, including any known communication technologies, devices, media, and protocols supportive of remote data communications, examples of which will be described in more detail below with respect to FIG. 9.

Although FIG. 8 illustrates a particular arrangement of the client devices 806A-806N, the one or more networks 808, the service provider 802, and the one or more servers 804, various additional arrangements are possible. For example, the client devices 806A-806N may directly communicate with the one or more servers 804, bypassing the network 808. Or alternatively, the client devices 806A-806N may directly communicate with each other. The service provider 802 may be a public cloud service provider which owns and operates their own infrastructure in one or more data centers and provides this infrastructure to customers and end users on demand to host applications on the one or more servers 804. The servers may include one or more hardware servers (e.g., hosts), each with its own computing resources (e.g., processors, memory, disk space, networking bandwidth, etc.) which may be securely divided between multiple customers, each of which may host their own applications on the one or more servers 804. In some embodiments, the service provider may be a private cloud provider which maintains cloud infrastructure for a single organization. The one or more servers 804 may similarly include one or more hardware servers, each with its own computing resources, which are divided among applications hosted by the one or more servers for use by members of the organization or their customers.

Similarly, although the environment 800 of FIG. 8 is depicted as having various components, the environment 800 may have additional or alternative components. For example, the environment 800 can be implemented on a single computing device with the digital design system 600. In particular, the digital design system 600 may be implemented in whole or in part on the client device 806A. Alternatively, in some embodiments, the environment 800 is implemented in a distributed architecture across multiple computing devices.

As illustrated in FIG. 8, the environment 800 may include client devices 806A-806N. The client devices 806A-806N may comprise any computing device. For example, client devices 806A-806N may comprise one or more personal computers, laptop computers, mobile devices, mobile phones, tablets, special purpose computers, TVs, or other computing devices, including computing devices described below with regard to FIG. 9. Although three client devices are shown in FIG. 8, it will be appreciated that client devices 806A-806N may comprise any number of client devices (greater or smaller than shown).

Moreover, as illustrated in FIG. 8, the client devices 806A-806N and the one or more servers 804 may communicate via one or more networks 808. The one or more networks 808 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 808 may be any suitable network over which the client devices 806A-806N may access the service provider 802 and server 804, or vice versa. The one or more networks 808 will be discussed in more detail below with regard to FIG. 9.

In addition, the environment 800 may also include one or more servers 804. The one or more servers 804 may generate, store, receive, and transmit any type of data, including communications medium data 620, user input data 622, or other information. For example, a server 804 may receive data from a client device, such as the client device 806A, and send the data to another client device, such as the client device 806B and/or 806N. The server 804 can also transmit electronic messages between one or more users of the environment 800. In one example embodiment, the server 804 is a data server. The server 804 can also comprise a communication server or a web-hosting server. Additional details regarding the server 804 will be discussed below with respect to FIG. 9.

As mentioned, in one or more embodiments, the one or more servers 804 can include or implement at least a portion of the digital design system 600. In particular, the digital design system 600 can comprise an application running on the one or more servers 804 or a portion of the digital design system 600 can be downloaded from the one or more servers 804. For example, the digital design system 600 can include a web hosting application that allows the client devices 806A-806N to interact with content hosted at the one or more servers 804. To illustrate, in one or more embodiments of the environment 800, one or more client devices 806A-806N can access a webpage supported by the one or more servers 804. In particular, the client device 806A can run a web application (e.g., a web browser) to allow a user to access, view, and/or interact with a webpage or website hosted at the one or more servers 804.

Upon the client device 806A accessing a webpage or other web application hosted at the one or more servers 804, in one or more embodiments, the one or more servers 804 can provide a user of the client device 806A with an interface to provide an image file or a document including an image, an interface to select a portion of a document including an image, or an interface to select a canvas/workspace. Upon receiving the image or selection, the one or more servers 804 can automatically perform the methods and processes described above to perform multi-frame editing of the image.

As just described, the digital design system 600 may be implemented in whole, or in part, by the individual elements 802-808 of the environment 800. It will be appreciated that although certain components of the digital design system 600 are described in the previous examples with regard to particular elements of the environment 800, various alternative implementations are possible. For instance, in one or more embodiments, the digital design system 600 is implemented on any of the client devices 806A-806N. Similarly, in one or more embodiments, the digital design system 600 may be implemented on the one or more servers 804. Moreover, different components and functions of the digital design system 600 may be implemented separately among client devices 806A-806N, the one or more servers 804, and the network 808.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
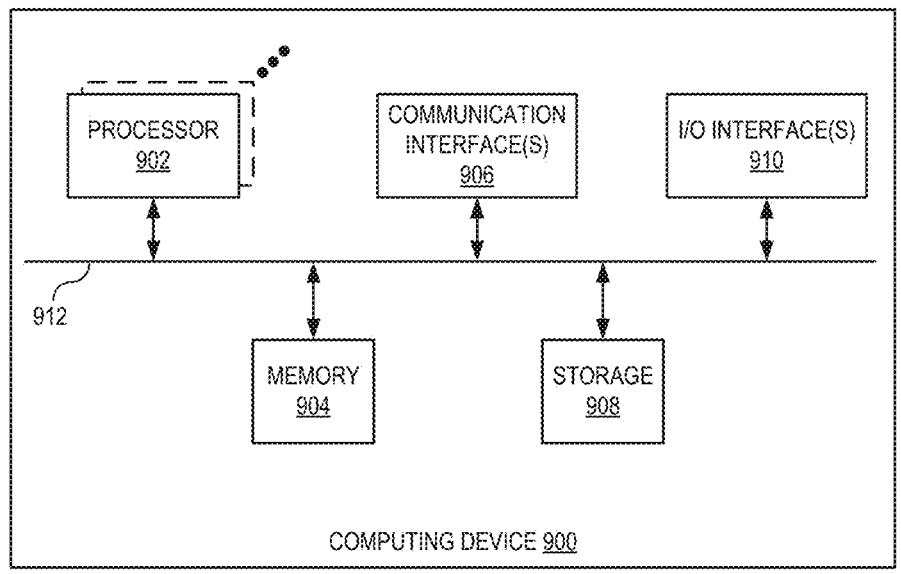
FIG. 9 illustrates a block diagram of an exemplary computing device in accordance with one or more embodiments.

FIG. 9 illustrates, in block diagram form, an exemplary computing device 900 that may be configured to perform one or more of the processes described above. One will appreciate that one or more computing devices such as the computing device 900 may implement the image processing system. As shown by FIG. 9, the computing device can comprise a processor 902, memory 904, one or more communication interfaces 906, a storage device 908, and one or more input or output ("I/O") devices/interfaces 910. In certain embodiments, the computing device 900 can include fewer or more components than those shown in FIG. 9. Components of computing device 900 shown in FIG. 9 will now be described in additional detail.

In particular embodiments, processor(s) 902 includes hardware for executing instructions, such as those making up a computer program. As an example, and not by way of limitation, to execute instructions, processor(s) 902 may retrieve (or fetch) the instructions from an internal register, an internal cache, memory 904, or a storage device 908 and decode and execute them. In various embodiments, the processor(s) 902 may include one or more central processing units (CPUs), graphics processing units (GPUs), field programmable gate arrays (FPGAs), systems on chip (SoC), or other processor(s) or combinations of processors.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The computing device 900 can further include one or more communication interfaces 906. A communication interface 906 can include hardware, software, or both. The communication interface 906 can provide one or more interfaces for communication (such as, for example, packet-based communication) between the computing device and one or more other computing devices 900 or one or more networks. As an example, and not by way of limitation, communication interface 906 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can comprise hardware, software, or both that couples components of computing device 900 to each other.

The computing device 900 includes a storage device 908 includes storage for storing data or instructions. As an example, and not by way of limitation, storage device 908 can comprise a non-transitory storage medium described above. The storage device 908 may include a hard disk drive (HDD), flash memory, a Universal Serial Bus (USB) drive or a combination these or other storage devices. The computing device 900 also includes one or more I/O devices/interfaces 910, which are provided to allow a user to provide input to (such as user strokes), receive output from, and otherwise transfer data to and from the computing device 900. These I/O devices/interfaces 910 may include a mouse, keypad or a keyboard, a touch screen, camera, optical scanner, network interface, modem, other known I/O devices or a combination of such I/O devices/interfaces 910. The touch screen may be activated with a stylus or a finger.

The I/O devices/interfaces 910 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 910 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

I claim:

1. A computer-implemented method, comprising:
receiving, by a first thread, a first set of inputs on a graphical user interface;
receiving, by the first thread, a second set of inputs on the graphical user interface, wherein at least one input of the second set of inputs is received concurrently with at least one input of the first set of inputs;
determining that the first set of inputs represent a first multi-frame request, wherein a multi-frame request includes a series of inputs that produce a continuous response;
determining that the second set of inputs represent a second multi-frame edit request;
generating a first multi-frame edit task, the first multi-frame edit task including a communications channel between the first thread and a second thread for caching the first set of inputs;
generating a second multi-frame edit task, the second multi-frame edit task including the second set of inputs;
enqueuing the first multi-frame edit task in a task queue of the second thread;
processing, by the second thread, the first multi-frame edit task;
determining that the second thread is processing an edit task; and
in response to determining that the second thread is processing an edit task, enqueuing the second multi-frame edit task in the task queue of the second thread.

2. The computer-implemented method of claim 1, wherein processing the first multi-frame edit task comprises:
dequeuing the first multi-frame edit task from the task queue;
processing, by the second thread, the first set of inputs to generate at least one output; and
sending the at least one output to the first thread.

3. The computer-implemented method of claim 2, wherein processing the first set of inputs comprises:
dequeuing the communications channel from the task queue; and
replaying the first set of inputs from the communications channel.

4. The computer-implemented method of claim 1, wherein generating the second multi-frame edit task comprises:
creating a second communications channel between the first thread and the second thread for caching the second set of inputs.

5. The computer-implemented method of claim 1, further comprising:
terminating the communications channel between the first thread and the second thread in response to processing a sentinel value in the first multi-frame edit task.

6. The computer-implemented method of claim 1, wherein processing the first multi-frame edit task comprises:
determining that the first set of inputs in the first multi-frame edit task indicate a task type where a final input in the first set of inputs defines the first multi-frame edit task; and
in response to determining that the first set of inputs in the first multi-frame edit task indicate the task type where the final input in the first set of inputs defines the first multi-frame edit task, bypassing one or more inputs of the first set of inputs other than the final input.

7. The computer-implemented method of claim 1, further comprising:
receiving a request to undo the first multi-frame edit task; and
undoing the first multi-frame edit task based on the first set of inputs from the communications channel.

8. A non-transitory computer-readable storage medium including instructions stored thereon which, when executed by at least one processor, cause the at least one processor to:
receive, by a first thread, a first set of inputs on a graphical user interface;
receive, by the first thread, a second set of inputs on the graphical user interface, wherein at least one input of the second set of inputs is received concurrently with at least one input of the first set of inputs;
determine that the first set of inputs represent a first multi-frame request, wherein a multi-frame frame request includes a series of inputs that produce a continuous response;
determine that the second set of inputs represent a second multi-frame edit request;
generate a first multi-frame edit task, the first multi-frame edit task including a communications channel between the first thread and a second thread for caching the first set of inputs;
generate a second multi-frame edit task, the second multi-frame edit task including the second set of inputs;
enqueue the first multi-frame edit task in a task queue of the second thread;
process, by the second thread, the first multi-frame edit task;
determining that the second thread is processing an edit task; and
in response to determining that the second thread is processing an edit task, enqueuing the second multi-frame edit task in the task queue of the second thread.

9. The non-transitory computer-readable storage medium of claim 8, wherein processing the first multi-frame edit task comprises:
determining that the second thread is not currently processing an edit task;
processing, by the second thread, the first set of inputs to generate at least one output; and
sending the at least one output to the first thread.

10. The non-transitory computer-readable storage medium of claim 9, wherein processing the first set of inputs comprises:
dequeuing the communications channel from the task queue; and
replaying the first set of inputs from the communications channel.

11. The non-transitory computer-readable storage medium of claim 8, wherein generating the second multi-frame edit task comprises:
creating a second communications channel between the first thread and the second thread for caching the second set of inputs.

12. The non-transitory computer-readable storage medium of claim 8, wherein the instructions further cause the at least one processor to:
terminate the communications channel between the first thread and the second thread in response to processing a sentinel value in the first multi-frame edit task.

13. A system, comprising:
a computing device including a memory and at least one processor, the computing device implementing a digital design system,
wherein the memory includes instructions stored thereon which, when executed, cause the digital design system to:
receive, by a first thread, a first set of inputs on a graphical user interface;
receive, by the first thread, a second set of inputs on the graphical user interface, wherein at least one input of the second set of inputs is received concurrently with at least one input of the first set of inputs;
determine that the first set of inputs represent a first multi-frame request, wherein a multi-frame request includes a series of inputs that produce a continuous response;
determine that the second set of inputs represent a second multi-frame edit request;
generate a first multi-frame edit task, the first multi-frame edit task including a communications channel between the first thread and a second thread for caching the first set of inputs;
generate a second multi-frame edit task, the second multi-frame edit task including the second set of inputs;
enqueue the first multi-frame edit task in a task queue of the second thread;
process, by the second thread, the first multi-frame edit task;
determining that the second thread is processing an edit task; and
in response to determining that the second thread is processing an edit task, enqueuing the second multi-frame edit task in the task queue of the second thread.

14. The system of claim 13, wherein the instructions to process the first multi-frame edit task, when executed, further causes the digital design system to:
determine that the second thread is not currently processing an edit task;
process, by the second thread, the first set of inputs to generate at least one output; and
send the at least one output to the first thread.

15. The system of claim 14, wherein the instructions to process the first set of inputs, when executed, further causes the digital design system to:
dequeue the communications channel from the task queue; and
replay the first set of inputs from the communications channel.

16. The system of claim 13, wherein the instructions to generate the second multi-frame edit task, when executed, further causes the digital design system to:
create a second communications channel between the first thread and the second thread for caching the second set of inputs.

17. The system of claim 13, wherein the instructions further cause the digital design system to:
terminate the communications channel between the first thread and the second thread in response to processing a sentinel value in the first multi-frame edit task.

* * * * *